United States Patent Office 3,303,011
Patented Feb. 7, 1967

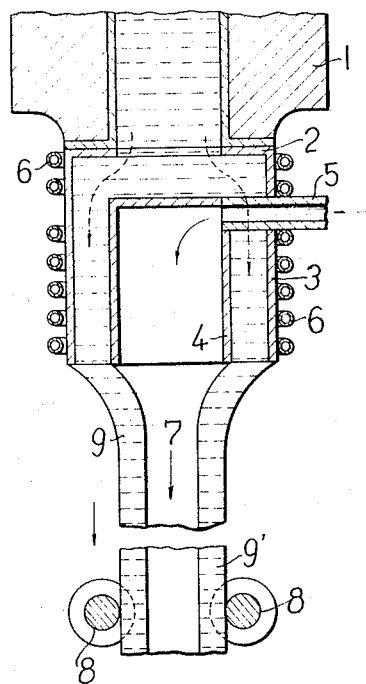
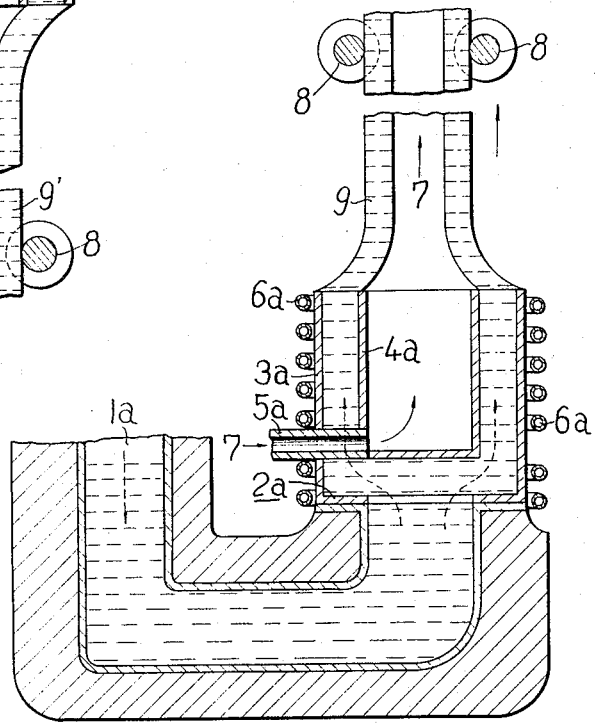

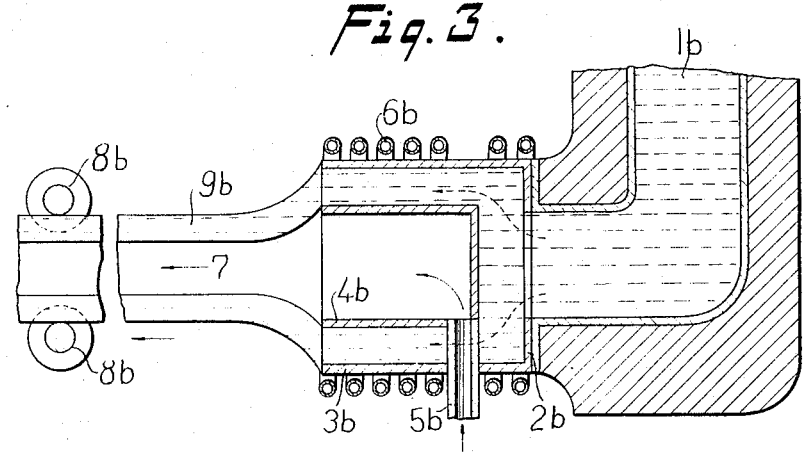
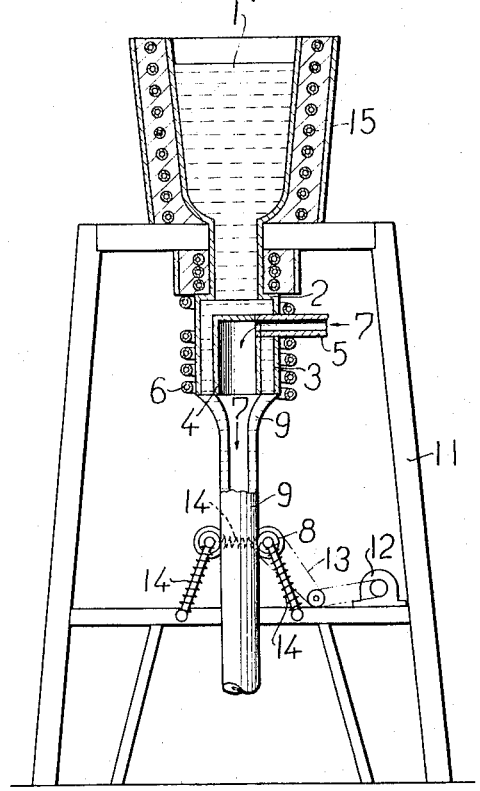

3,303,011
PROCESS AND APPARATUS FOR MANUFACTURING ELONGATED GLASS PRODUCTS
Fukuhichi Fukuzaki, Tokyo-to, Japan, assignor to Kabushiki Kaisha Obara Kogaku Garasu Seizosho, Kanagawa-ken, Japan, a corporation of Japan
Filed Mar. 30, 1966, Ser. No. 563,937
8 Claims. (Cl. 65—88)

This application is a continuation-in-part of copending application Serial No. 236,669, filed November 9, 1962, and now abandoned.

This invention relates to the production of elongated glass products, and more specifically elongated glass tubes.

Glass tubes have been heretofore manufactured inefficiently by the manual blow process in small lots. Recently, modernized mechanized production processes have been developed in the glass industry, of which Danner process and Schueler process are predominant. As commonly known to those skilled in the art, the manual blow process requires a high grade of skill and in addition has a grave drawback that the uniformity in the products has left much to be desired. With the mechanical processes, difficulties arise in the formation of glass products, especially when the glass flow rate is small, resulting from smaller thermal capacity of the fluidized glass.

Various methods have been proposed to improve the thermal capacity of such glass tube drawing machines and higher rates of fused glass flow have been adopted to obviate the above-mentioned drawback, thus keeping the temperature of the fused glass within a proper range for optimum tube manufacture. Such mechanical blow glass tube manufacturing machines are especially suitable for manufacturing glass tubes on a large scale and thus uneconomical for small lot production. More specifically, with Schueler process, the flow rate of fluidized glass is selected to be high so as to keep the manufacturing temperature at an optimum value and therefore the tubular product must be also drawn-off at a correspondingly high rate. In addition, the mandrel is kept in continuous rotation so as to improve the roundness in the products, while pressurized air is constantly supplied through a core passage formed in the mandrel. In the Schueler process, a dip container is supplied from an outside source with fused glass and the container itself is kept in constant rotation. Thus, the charge contained in the container consists of a mixture of the continuously incoming material with previously supplied material, which will frequently cause unfavorable laminations in the final products and adversely affect the uniformity and continuity of the products. Further, care must be taken so as to keep the liquid level in the container at a certain selected height. For this purpose, precise control of the operating conditions of the machine is also required. In this type of machine a core tube is provided, the lower end of which is dipped a certain distance into the bath of fused glass so as to be heated thereby, for the purpose of keeping the inside temperature of the core constant as possible. As the core tube is made of refractory material, troubles have been frequently encountered in contamination of the fused glass material contained in the container. For obtaining the most accurate possible roundness of the products, it is necessary to rotate both the container and the core tube, as well as to keep the inside temperature of the latter at a constant level as possible, as described above.

It is therefore the main object of the invention to provide a unique process for the production of elongated glass products, whereby the desired uniformity in the nature of the products, the accurate control of manufacturing temperature, roundness, eccentricity and production rate can be easily and effectively attained.

In accordance with the invention, a new process and apparatus have been discovered which permits intermittent or continuous production of elongated glass products having amazing uniformity of dimensions in any desired geometry of cross section. It has been found that such results are readily achieved if a stationary tube-forming nozzle is used connected through a constricted feed pipe having a smaller cross-section than that of the nozzle to a supply of molten glass. By such an arrangement, the nozzle functions merely as a shape imparting guide and does not directly control the flow of the glass. Instead, the flow of glass is controlled by carefully controlled application of heat to vary the viscosity of the glass and thereby its velocity of flow.

Such a production plan becomes possible only if a constricted feed pipe or conduit is used as the connection between the tube-forming nozzle and the forehearth or other main supply of glass. In this way, heat can be applied to the flowing glass with sufficient control at the constricted feed pipe so as to maintain the velocity of flow in the adjacent tube-forming nozzle substantially constant, with the ultimate result that the glass tubing extruded out from the trailing edge of the nozzle is virtually perfectly uniform. The constricted feed pipe is somewhat like a choke coil or dam gate wherein large fluctuations of temperature and pressure in the forehearth or main supply of glass can be readily controlled and cancelled out due to the fact that the applied heat can act almost immediately, with very little thermal lag, upon the small rod of flowing glass that is contained in the feed pipe. Thus, by the time the flowing glass reaches the larger cross-section of the tube-forming nozzle, it has been optimized into a steady state condition of virtually constant flow at an exact velocity and auxiliary heating means are only required about the tube-forming nozzle to maintain the temperature of constant flow which has been previously established in the glass during its traverse of the constricted feed pipe. Since the only movement in the apparatus is that of the glass flow, and since that flow is virtually perfectly controlled, it can be appreciated that elongated extruded glass products of great uniformity are achieved in a simple and efficient manner.

In addition to the constricted feed pipe, which is critically important, the invention requires use of a conduit leading from the ambient atmosphere outside the exterior wall of the tube-forming nozzle into the innermost core space within the nozzle. This conduit permits ambient air to flow into the hollow interior of the glass tubing being formed at the trailing edge of the nozzle, whereby collapse of the tubing due to unequalized pressure cannot occur. Also, such flow of ambient air equalizes temperatures at both the interior and exterior of the tubing as it leaves the nozzle and in this way bulges, laminations, or other distortions which might result from non-uniform flow are prevented. The ambient air flow through the aforesaid conduit will take place naturally without pumps or other applied force due to the chimney effect in the heated nozzle interior.

One other important feature is the use of platinum in the walls of the constricted feed pipe and the tube-forming nozzle. Since it is here where the glass flow is controlled and optimized, it is necessary to use platinum to avoid drag or similar physical disruption of the flow conditions on or in the outer boundaries of the glass which are in contact with or near such walls.

From the foregoing description it will be evident that many different types of glass products as to cross-sectional geometry can be made with the process and apparatus of the invention since no part of the apparatus moves and there is virtually unlimited choice as to the form of cross-section incorporated in the tube-forming nozzle. Thus, while the invention may be hereafter described specifically in terms of conventional round glass tubing of annular cross-section, it will be understood that the term "glass tubing" as used in the specification and claims herein is defined to mean elongated extruded glass products of any other cross-section as well, since all of such glass products can be readily made in accordance with the invention.

Further objects, features and advantages of the invention will appear from detailed description of several preferred embodiments of apparatus for carrying out the process of the invention, which follows in connection with the accompanying drawings. It should however be understood that these embodiments are given only by way of example and a number of modifications therefrom can be made without departing the spirit and scope of the present invention as defined in the claims appended hereto.

In the drawings, same reference numerals indicate similar parts throughout the several figures thereof:

In the drawings:

FIG. 1 is a longitudinal section through main working parts of the first embodiment of the apparatus employed in the present invention, wherein glass tubes are shaped and drawn-off in the downward direction;

FIG. 2 is also a longitudinal section through those of the second embodiment of the apparatus employed in the present invention wherein glass tubes are shaped and drawn-off in the upward direction, FIG. 3 is again a longitudinal section of a further embodiment of the apparatus employed in the present invention, wherefrom tubular products are drawn-off in the horizontal direction; and FIG. 4 is a diagrammatic elevation view of the glass tubing machine, wherein main working parts are constructed substantially as shown in FIG. 1 thereof.

Referring to FIG. 1, numeral 1 denotes a constricted feed pipe leading into a tube-forming nozzle assembly 2. The feed pipe 1 has a smaller cross-section diameter than that of nozzle assembly 2 and is kept at a constant temperature by means of an electric heating coil not shown which coil may be of any conventional design as denoted by 15 in FIG. 4. Feed pipe 1 is filled with fused glass as shown, which may be continuously replenished from an outside supply source, as for example the container shown at the top of FIG. 4.

At the bottom of feed pipe 1, the tube-forming nozzle assembly 2 is fixedly attached thereto by means of suitable fixing means such as machine screws, which are not shown for simplicity. Tube-forming nozzle assembly generally denoted by 2 is made from a heat-resisting as well as chemically stable metal such as platinum or the like, and kept in free communication with the interior or container 1. The nozzle assembly comprises a shell 3 and a core 4. High frequency heating coil 6 surrounds the nozzle assembly 2 over the whole length thereof and serves for keeping the bath temperature of shell 3 at a substantially constant level. The core chamber 4 is open at its lower end and mounted concentrically to shell 3 by means of a plurality of bridging members not shown. An air inlet tube 51 communicates with the interior space of core 4 at the top end thereof and extends through the wall of shell 3, thus in communication with ambient air. The fused glass supplied from feed pipe 1 to nozzle 2 will flow down from the circular ring outlet opening formed at the bottom of the nozzle, and at substantially constant velocity determined by several parameters such as fluidity of the fused material, frictional resistance provided by the inside walls of the nozzle assembly and head pressure of the molten fuse of glass 9, all of which are readily controlled by application of heat to the narrow rod of glass flowing through the pipe 1. The thus down-flowing glass fuse 9 produces an inverted and hollow cone at the outlet of the nozzle, the hollow space is however in free communication with atmospheric air through core space 4 and tube 5, as denoted numerals 7 and attached small arrows. The fuse continues to flow down until it is caught by a couple of drawing rolls 8 and forms a continuous glass tube.

It will be understood from the foregoing that the temperature of the fused cone as it exits from the trailing edge of nozzle 2 is substantially equal to that measured at the lower end thereof. Due to this constant temperature, which is primarily controlled from the constricted feed pipe 1, the fused glass will flow down from the outlet of nozzle 2 at a constant velocity. The cross-section of the fused cone is only a reduction of that of the ring outlet opening of the nozzle, so that by finishing shell 3 and core 4 to truly round shapes the glass tube thus produced will be also of true roundness and otherwise possible deviation from the desired truly round tubing may be easily and effectively obviated. The finished glass tubing can be produced by drawing the material tubing at a selected constant velocity by means of rolls 8.

Upward drawing of the glass tubing can be equally realized with use of the second embodiment machine illustrated in FIG. 2.

Fused glass material flows through a U-shaped constricted feed pipe 1a at a selected constant temperature and the pipe is supplied with molten glass from a container as described in FIG. 1. The feed pipe proper can be made again from platinum. On the outlet end of the feed pipe 1a, a nozzle assembly generally denoted by 2a is fixedly and rigidly mounted by means of suitable fixing means such as machine screws, which are not shown. The nozzle assembly comprises also a shell 3a and a core chamber 4a arranged concentrically therewithin and open at its top end. Electrical heating coil 6a connected to a suitable high frequency current source not shown surrounds the assembly over the whole length thereof, said nozzle being made again of platinum. The interior ring space of the nozzle assembly between shell 3a and core 4a is kept in free communication with the interior space of shell 1a. The fused glass coming up from feed pipe 1a to the nozzle ring space is kept at a substantially constant temperature under the influence of high frequency heating coil 6a and then is delivered from the uppermost outlet end of nozzle assembly 2a in the upward direction substantially at a constant velocity determined by several parameters such as frictional wall resistance, fluidity of the fuse, gravity, statical head of the fuse and the like, so as to form a hollow cone as shown.

The cone will be further turned into a tubing, the hollow space being filled with atmospheric air flowing through air inlet tube 5a and core space as hinted by numerals 7 and attached small arrows. The shaped tubing 9 is drawn upwards by means of a couple of drawing rolls 8a at a selected constant velocity.

In FIG. 3, a third embodiment machine is shown, wherefrom the finished glass tubing is drawn horizontally, instead of vertically. In this figure, similar parts are shown by the same reference numerals as used in FIGURES 1 and 2 except in FIGURE 3 they are suffixed with b. From the detailed description disclosed in connection with FIGS. 1 and 2, the operation of the present embodiment can be easily understood without further explanation.

In FIG. 4, numeral 11 denotes a machine frame, which mounts an electric motor 12 adapted to drive the drawing rolls 8 through belt transmission 13. These rolls 8 are mounted resiliently through spring mounting 14 on the frame 11. 15 denotes a high frequency induction heating coil as was referred to herein. The operation of the machine shown in FIG. 4 has been fully described in connection with FIG. 1.

In all of the foregoing embodiments of the apparatus for carrying out the process according to the invention, the fused glass is controlled in a feed pipe of smaller cross-section diameter than that of the adjacent tube-forming nozzle. In the preferred embodiments of the invention, the cross-section of the feed pipe may vary from about 0.1 to about 0.5 times that of the adjacent tube-forming nozzle and is made of platinum. The molten fused glass is introduced into the tube-forming nozzle without contact with ambient atmosphere and with no fear of being oxidized and contaminated. It is therefore assured by the present invention that high grade glass tubing is manufactured having a superior quality with respect to its chemical as well as physical nature and characterized by its excellent uniformity. In the conventional mechanical glass tubing process the tube shaping is carried out while exposed to the ambient atmosphere generally to a large extent and thus the fused glass is brought into solidification at a relatively high rate by reason of the contact with the ambient atmosphere. In addition; a large capacity of the reservoir for the fused glass material is required and careful measurements are necessary for keeping the container at a constant temperature. As is commonly known to those skilled in the art, proper control of the bath for such a purpose is highly difficult. To overcome these difficulties the present novel process utilizes a tube-forming nozzle comprising an outer shell and a core arranged therein and all these parts are made of a chemically stable metal such as platinum and the nozzle assembly is heated by an induction heating coil surrounding the latter, so that an easy and accurate control of the temperature of the nozzle assembly can be assured so as to keep it at a practically constant-level.

In the present novel process, a tubing nozzle of relatively small size can be employed so that various kinds of glass may be used without difficulty. In addition, because of the close control of the processing temperature afforded by the use of a feed pipe of constricted cross-section, the glass flow rate can be easily controlled with great uniformity. This easy adjustment of the glass tubing rate as well as the processing temperature will enable the manufacture of various sizes of glass tubing by the utilization of one and the same glass tubing nozzle. When the fused glass material having a substantially constant temperature is supplied from the feed pipe to the forming nozzle, which is kept substantially at the processing temperature in the above-mentioned way over its whole cross-section, it is heated in and by the nozzle so that it is brought to the desired processing temperature over its whole cross-section and the fluidity of the fused glass is thus kept at a constant value at any selected point thereof. In this way, the temperature of the glass is kept at a substantially constant temperature practically equal to that of the tubing nozzle, and thus equalized throughout its cross-sectional area. As a result of the thus established optimum flow conditions of the tubing glass material, the efflux from the nozzle has a cross-section which is smaller than that of the nozzle opening but of the same configuration as that of the nozzle opening. This favorable nature of the efflux makes it easy to control the roundness or the desired eccentricity, as the case may be, of the glass tubings thus manufactured.

This advantage obtainable by the present process will obviate the use of the conventional rotary core means, forced supply of pressurized air and the like, which have hitherto been employed for the control of the roundness or eccentricity in the products and thus making it simple to manufacture elongated glass products, hollow or rigid, as the case may be. For the production of glass rods, instead of hollow tubings, the air inlet pipe must be plugged or the core means should be removed. These rods may have, if desired, a non-rounded cross-section of any desired shape. According to the present process, the production rate may be readily controlled to some extent by controlling the temperature of the tubing nozzle in the above-mentioned way. The products of the process are of such superior qualities, especially in their uniformity, so as to be similar to optical glass products.

It will be understood that it is intended to cover all changes and modifications of the preferred embodiments of the invention, herein chosen for the purpose of illustration, which do not constitute departures from the spirit and scope of the invention.

What is claimed is:

1. In a process for manufacturing glass tubing in a feed zone having stationary platinum walls and in an adjacent tube-forming zone having two stationary platinum walls, one inside the other, to define a void therebetween of the desired tubing configuration, the steps comprising passing molten glass first into the feed zone and then from said feed zone into said tube-forming zone to fill the void between said platinum walls of the tube-forming zone and form glass tubing at the trailing edge of said walls, providing said feed zone with a cross-section smaller than the cross-section of said tube-forming zone to achieve control over the flow of glass passing through said tube-forming zone, flowing a stream of ambient air through the interior of said tube-forming zone so that the inner platinum wall thereof and the inner surface of the glass tubing formed at the trailing edge of said inner wall are exposed to the ambient atmosphere to equalize cooling of the glass tubing being formed and prevent distortion thereof, and heating the exterior walls of said feed zone and said tube-forming zone to further control the rate of flow of the glass material through the void between the walls of said tube-forming zone.

2. A process as in claim 1 wherein the cross-section diameter of said feed zone is from about 0.1 to about 0.5 times the diameter of said tube-forming zone.

3. A process as in claim 1 wherein said glass tubing is discharged upwardly from said tube-forming zone.

4. A process as in claim 1 wherein said glass tubing is discharged horizontally from said tube-forming zone.

5. A process as in claim 1 wherein said glass tubing is discharged downwardly from said tube-forming zone.

6. A glass extruding apparatus comprising a platinum-walled supply container and a detachable tube-forming nozzle adjacent to said supply container, said supply container including a constricted feed section the cross-section of which is smaller than the cross-section of said tube-forming nozzle, said constricted feed section being connected to said tube-forming nozzle to supply glass material thereto and to control the flow of the glass through said tube-forming nozzle, heating means arranged around the exterior of said constricted feed section and of said tube-forming nozzle to further control the flow of glass through the tube-forming nozzle, said tube-forming nozzle including two stationary platinum walls which are positioned one inside the other to define a space therebetween having a uniform cross-section in the shape of the tubing desired and to also provide an innermost core space within the confines of the inner one of said two platinum walls, and an open conduit extending from the ambient atmosphere adjacent the exterior of said tubing-forming nozzle into said innermost core space to permit flow of a stream of ambient air through said innermost core space as glass tubing is being formed.

7. An apparatus as in claim 6 wherein the cross-section diameter of said constricted feed section is from about 0.1 to about 0.5 times the diameter of said tube-forming nozzle.

8. An apparatus as in claim 6 wherein the inner one of said two platinum walls is eliminated and said open conduit is plugged.

References Cited by the Examiner
UNITED STATES PATENTS

| | | | |
|---|---|---|---|
| 2,306,164 | 12/1942 | Harrison | 65—183 |
| 2,489,508 | 11/1949 | Stalego | 65—1 |
| 2,947,027 | 8/1960 | Slayter | 65—1 |
| 3,078,695 | 2/1963 | Kozak et al. | 65—128 |

S. LEON BASHORE, *Acting Primary Examiner.*

G. R. MYERS, *Assistant Examiner.*